US010609364B2

(12) United States Patent
Geng et al.

(10) Patent No.: US 10,609,364 B2
(45) Date of Patent: Mar. 31, 2020

(54) PUPIL SWIM CORRECTED LENS FOR HEAD MOUNTED DISPLAY

(71) Applicant: Facebook Technologies, LLC, Menlo Park, CA (US)

(72) Inventors: Ying Geng, Bellevue, WA (US); Yusufu Njoni Bamaxam Sulai, Bothell, WA (US); Jacques Gollier, Bellevue, WA (US); Brant Carlton Lewis, San Carlos, CA (US); Brian Wheelwright, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/026,837

(22) Filed: Jul. 3, 2018

(65) Prior Publication Data

US 2019/0313087 A1    Oct. 10, 2019

Related U.S. Application Data

(60) Provisional application No. 62/654,231, filed on Apr. 6, 2018.

(51) Int. Cl.
*H04N 13/344*    (2018.01)
*G02B 27/01*    (2006.01)

(52) U.S. Cl.
CPC ....... *H04N 13/344* (2018.05); *G02B 27/0172* (2013.01); *G02B 2027/011* (2013.01); *G02B 2027/0178* (2013.01); *H04N 2213/002* (2013.01)

(58) Field of Classification Search
CPC .............. G02B 27/0172; G02B 2027/011
See application file for complete search history.

(56) References Cited

U.S. PATENT DOCUMENTS

| | | | |
|---|---|---|---|
| 10,082,865 B1* | 9/2018 | Raynal | G06F 3/013 |
| 2004/0108971 A1* | 6/2004 | Waldern | G02B 27/0093 345/8 |
| 2012/0120498 A1* | 5/2012 | Harrison | G02B 3/08 359/630 |
| 2014/0145913 A1* | 5/2014 | Tanahashi | G02B 27/0101 345/7 |
| 2015/0212325 A1* | 7/2015 | Choi | G02B 5/04 359/13 |
| 2015/0234508 A1* | 8/2015 | Cho | G06F 3/0412 345/173 |
| 2016/0302665 A1* | 10/2016 | Swedish | A61B 3/152 |
| 2017/0227770 A1* | 8/2017 | Carollo | G02B 27/0172 |
| 2017/0336539 A1* | 11/2017 | Perreault | G02B 3/08 |
| 2018/0045949 A1* | 2/2018 | Hua | G02B 5/04 |
| 2018/0149862 A1* | 5/2018 | Kessler | G02B 27/30 |

(Continued)

*Primary Examiner* — Brian T Pendleton
*Assistant Examiner* — Frank Johnson
(74) *Attorney, Agent, or Firm* — Matthew A. Pequignot; Evan J. Newman

(57) ABSTRACT

A lens for a head mounted display is configured for directing and collimating image light from pixels of an electronic display to a pupil of a user's eye to lessen a pupil swim effect. A method of configuring a lens for directing and collimating image light from an electronic display to a pupil of a user's eye includes configuring the lens to lessen a difference between observed distortions of imagery displayed by the electronic display at different gaze angles of the user's eye.

20 Claims, 17 Drawing Sheets

(56) References Cited

U.S. PATENT DOCUMENTS

2018/0364482 A1* 12/2018 Georgiou ............ G02B 27/0172
2019/0128691 A1*  5/2019 Chen ................... G01C 21/365
2019/0235266 A1*  8/2019 Ide ....................... G02B 5/1814

* cited by examiner 10 degree gaze 20 degree gaze

US 10,609,364 B2

PUPIL SWIM CORRECTED LENS FOR HEAD MOUNTED DISPLAY

REFERENCE TO RELATED APPLICATIONS

The present application claims priority from U.S. Provisional Application No. 62/654,231 entitled "Pupil Swim Corrected Lens for a Head Mounted Display", filed on Apr. 6, 2018, and incorporated herein in its entirety.

FIELD

The present application is related to optical components and devices, and in particular to optics for head mounted displays.

BACKGROUND

Head mounted displays (HMDs) are used to provide virtual scenery to a user, or to augment real scenery with additional information or additional virtual objects. Stereoscopic images can be displayed e.g. by providing separate images to each eye of the user. In some HMD systems, at least one of a head or eye position and orientation of the user are tracked, and the displayed 3D scenery is adjusted in real time depending on the user's head orientation and gaze direction to provide an illusion of the user immersed into a simulated or augmented three-dimensional scenery.

A simulated scenery may have undesired distortions of three-dimensional perspective, focus anomalies, time lag, flicker, etc., which may cause nausea and visual fatigue of the viewer.

BRIEF DESCRIPTION OF THE DRAWINGS

Exemplary embodiments will now be described in conjunction with the drawings, in which.

DETAILED DESCRIPTION

Figure 1:
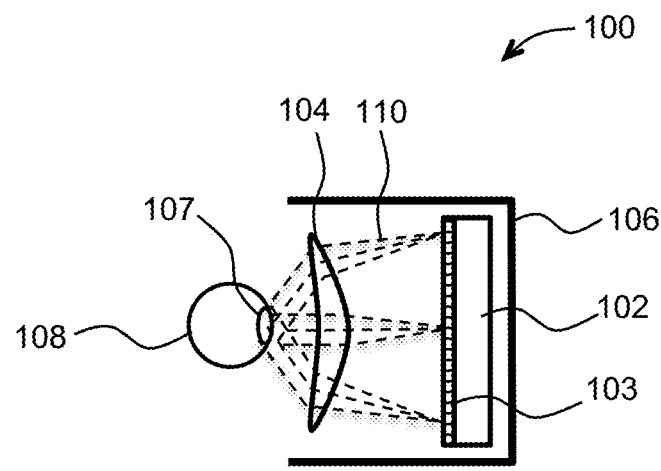
FIG. 1 is a schematic view of a head-mounted display (HMD) including a lens for providing an image to a user's eye.

A head-mounted display lens may have a drawback of a varying distortion of a central or peripheral view upon changing a direction of gaze by the viewer, causing the peripheral displayed objects to bend and shift upon changing the gaze angle of the user's eye. Such a distortion may cause discomfort, visual fatigue, and even nausea in some cases.

In accordance with the disclosure, there is provided a lens for a head mounted display. The lens can be configured to direct image light from an electronic display of the head mounted display to a pupil of a user's eye so as to lessen a difference between a first distortion of an image displayed by the electronic display and observed through the lens at a first gaze angle of the user's eye, and a second distortion of the image displayed by the electronic display and observed through the lens at a second, different gaze angle of the user's eye. The first gaze angle may correspond to a central position of the pupil, and the second gaze angle may correspond to an off-center position of the pupil. The first distortion may be a forward distortion defined by a set of distances between points of intersection of a first equiangular optical rays fan with the electronic display when rays of the first equiangular optical rays fan are propagated from the pupil back to the electronic display. The second distortion may be a gaze distortion defined by a set of distances between points of interception of a second equiangular optical rays fan with the electronic display when rays of the second equiangular optical rays fan are propagated from within the eye and back to the electronic display. The rays of the first fan may be propagated from a center of the pupil, and the rays of the second fan may be propagated from a center of the eye.

In one embodiment, the difference between the first and second distortions is less than 15 arcmin at the second gaze angle of the user's eye within a range of between −30 and 30 degrees, at an FOV of −5 to 5 degrees, and at a diameter of the pupil of 5 mm. In one embodiment, the difference between the first and second distortions is less than 40 arcmin at the second gaze angle of the user's eye larger than +/−30 degrees but less than +/−75 degrees, and at a diameter of the pupil of 5 mm. The difference between the first and second distortions may be less than 30 arcmin.

In accordance with the present disclosure, the lens may include a pancake lens. The pancake lens may include a reflective linear polarizer supported by a flat or mildly curved surface, and/or a quarter-wave waveplate supported by a flat surface. The pancake lens may also include a partially reflective optical surface having positive optical power. In one embodiment, the pancake lens comprises first and second elements spaced apart from each other, wherein the first element comprises a quarter-wave waveplate, and wherein the second element comprises a reflective linear polarizer. The reflective polarizer and the quarter-wave waveplate may be facing each other. The reflective polarizer and the quarter-wave waveplate may be flat.

In accordance with the present disclosure, the lens may include a Fresnel lens. The Fresnel lens may include at least one Fresnel surface facing away from the eye, or a plurality of Fresnel surfaces each facing away from the eye. The Fresnel lens may be absent Fresnel surfaces facing the eye. The lens may also include a regular, i.e. smooth lens.

In some embodiments, the above defined lens has a thickness of no greater than 30 mm, and/or a diameter of larger than 45 mm. The lens may include first and second lens elements, wherein each one of the first and second elements comprises at least one of: Fresnel lens, smooth lens, or partial Fresnel/smooth lens. The lens may have a monocular FOV of greater than 120 degrees but less than 140 degrees, and/or a binocular horizontal FOV of greater than 130 degrees but less than 170 degrees. The lens may be configured to accommodate a variation of a distance between the eye and the lens of up to 10 mm.

In accordance with the present disclosure, there is further provided a head mounted display comprising any of the lenses defined above and the electronic display optically coupled to the lens(es); the electronic display may have a diagonal length of between 1.5 inches and 3 inches, for example. The above mentioned difference between the first and second distortions may be e.g. less than 4 times pixel pitch of the electronic display at the second gaze angle of the user's eye within a range of between −30 and 30 degrees, at a field of view (FOV) of −5 to 5 degrees, and at a diameter of the pupil of 5 mm. The difference between the first and second distortions may also be less than 10 times pitch of the pixels of the electronic display at the second gaze angle of the user's eye larger than +/−30 degrees but less than +/−75 degrees, and at a diameter of the pupil of 5 mm. In some embodiments, the difference between the first and second distortions is less than 10 times pixel pitch of the electronic display.

In accordance with the present disclosure, there is further provided a method of configuring a head mounted display lens for directing image light from an electronic display of the head mounted display to a pupil of a user's eye. The method may include configuring the lens to lessen a difference between a first distortion of an image displayed by the electronic display and observed through the lens at a first gaze angle of the user's eye, and a second distortion of the image displayed by the electronic display and observed through the lens at a second, different gaze angle of the user's eye. The first gaze angle may correspond to a central position of the pupil, and the second gaze angle may correspond to an off-center position of the pupil. The first distortion may be a forward distortion defined by a set of distances between points of intersection of a first equiangular optical rays fan with the electronic display when rays of the first equiangular optical rays fan are propagated from a center of the pupil back to the electronic display, and the second distortion may be a gaze distortion defined by a set of distances between points of interception of a second equiangular optical rays fan with the electronic display when rays of the second equiangular optical rays fan are propagated from a center of the eye and back to the electronic display. In some embodiments, the difference between the first and second distortions is less than 4 times pixel pitch of the electronic display at the second gaze angle of the user's eye within a range of between −30 and 30 degrees, at a field of view (FOV) of −5 to 5 degrees, and at a diameter of the pupil of 5 mm. In some embodiments, the difference between the first and second distortions is less than 10 times pitch of the pixels of the electronic display at the second gaze angle of the user's eye larger than +/−30 degrees but less than +/−75 degrees, and at a diameter of the pupil of 5 mm. The configuring may include selecting a merit function in optical design software for lessening the difference between the first and second distortions.

Referring now to FIG. 1, a head mounted display (HMD) 100 of the present disclosure includes an electronic display 102 and a lens 104 mounted within a body 106. The lens 104 is configured for directing image light 110 from pixels 103 of the electronic display 102 to a pupil 107 of a user's eye 108. More specifically, light from each pixel 103 is collimated into a parallel or near-parallel, e.g. slightly diverging, light beam for entering the pupil 107 of the user's eye 108. A separate electronic display and lens may be provided for each eye of the user; only one eye is shown for brevity. The HMD 100 may be further equipped with various sensors to determine its position and orientation in three-dimensional space, and with sensors to detect position and orientation of each eye of the user to determine the gaze direction.

Figure 2A:
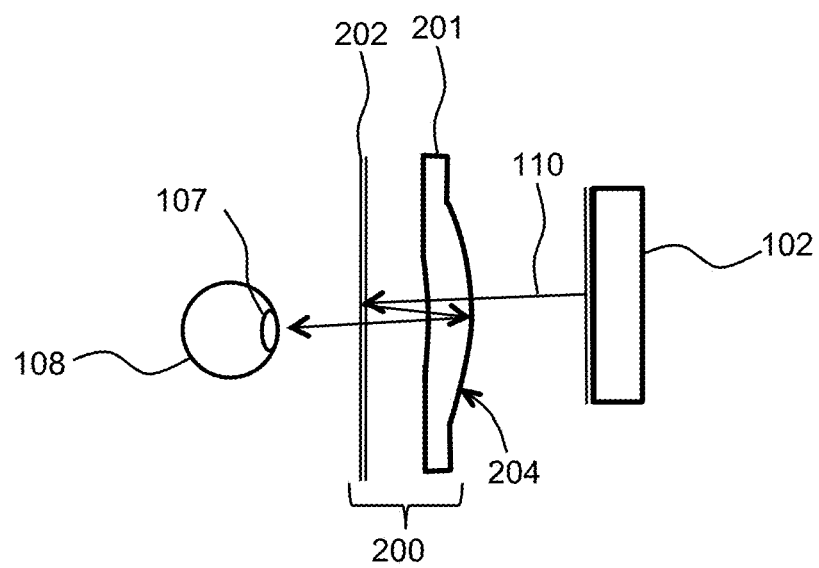
FIG. 2A is a schematic view of a pancake lens that can be used in the HMD of FIG. 1.

While various lens types can be used for the lens 104, a lens having a relatively short focal length and small weight is preferred to reduce weight momentum and associated strain and fatigue of user's neck. One example of such lens, termed herein "pancake lens", is illustrated in FIG. 2A. A pancake lens 200 includes a lens element 201 and a polarization-selective reflector 202. The pancake lens 200 has a folded optical configuration. To fold the optical path, polarization properties of light are used. In FIG. 2A, the image light 110 propagates through the lens element 201 and impinges onto the polarization-selective reflector 202, which reflects the image light 110 back towards the lens element 201. A partially reflecting distal surface 204 of the lens element 201, having a positive optical (focusing) power, reflects a portion of the image light 110 to propagate back through the polarization-selective reflector 202 towards the user's eye 108. The folded optical path configuration of the pancake lens 200 may allow weight and size reduction of the HMD 100.

Figure 2B:
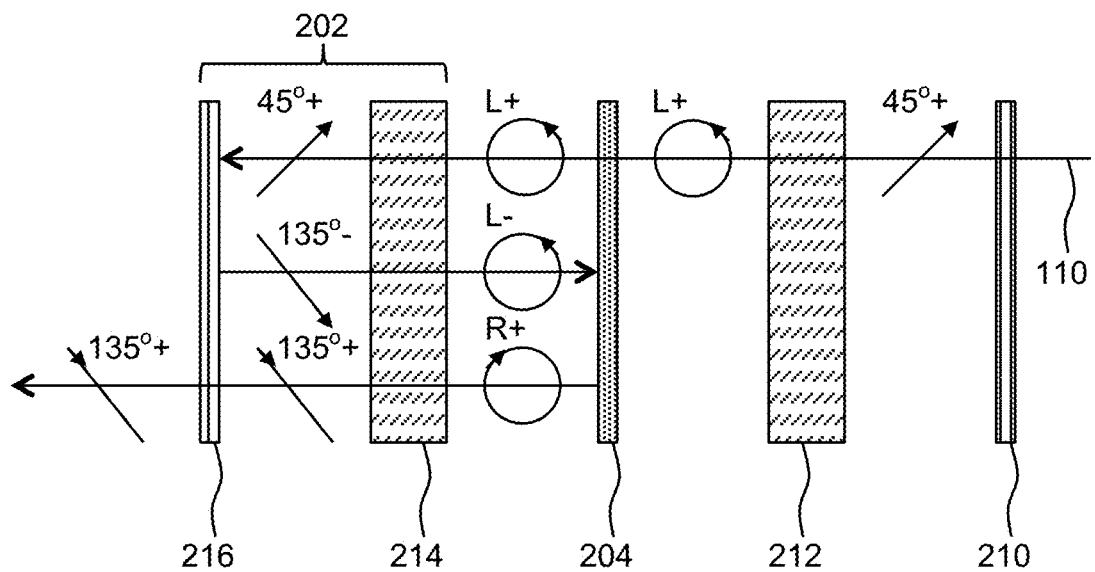
FIG. 2B is a polarization diagram of an optical beam propagating through the pancake lens of FIG. 2A.

The polarization performance of the pancake lens 200 of FIG. 2A is explained in FIG. 2B. The image light 110 propagates through a linear polarizer 210 and a first quarter-wave waveplate 212. The linear polarizer 210 can be mounted directly on the electronic display 102 to save space or may be a part of the electronic display 102, e.g. a liquid crystal display, which includes a pixelated liquid crystal cell between a pair of linear polarizers. The first quarter-wave waveplate 212 may be mounted directly on the linear polarizer 210. The optical axis of the first quarter-wave waveplate 212 is oriented at 45 degrees with respect to the polarization axis of the linear polarizer 210, such that the image light 110 is left-circularly polarized upon propagating through the first quarter-wave waveplate 212, as indicated by "L+". Herein, the sign "+" relates to the direction of propagation, which is assumed to be positive in going from right to left, and negative ("−") in going from left to right in FIGS. 2A and 2B. The image light 110 impinges on the partially reflecting distal surface 204 of the lens element 201, and a portion of that light, typically 50%, propagates through the lens element 201, impinging on the polarization-selective reflector 202. In the embodiment shown in FIG. 2B, the polarization-selective reflector 202 includes a second quarter-wave waveplate 214 oriented at 90 degrees with respect to the optical axis of the first quarter-wave waveplate 212, and a reflective linear polarizer/beamsplitter 216 having a transmission axis oriented at 135 degrees and a reflection axis oriented at 45 degrees with respect to the optical axis of the second quarter-wave waveplate 214. As a result, the image light 110 having a polarization at 45 degrees in "+" direction after propagating through the second quarter-wave waveplate 214, is reflected to propagate back through the second quarter-wave waveplate 214 and the lens element 201 (FIG. 2A). The partially reflecting distal surface 204 then reflects a portion of the image light 110 towards the user's eye 108. The polarization-selective reflector 202 blocks directly impinging light, thereby suppressing undesired light of the first pass entering the pupil 107 of the user's eye 108 and forming a ghost image.

Figure 3A:
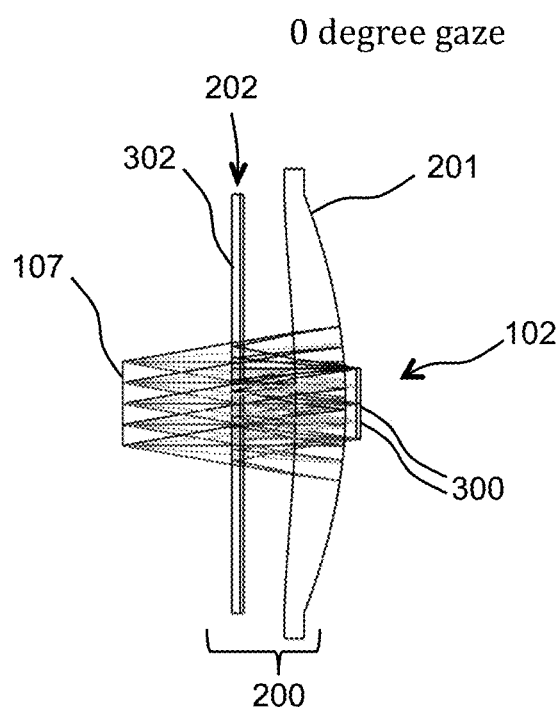
FIGS. 3A to 3D are ray-trace side views of a pancake lens at different gaze angles, according to one example.
Figure 3B:
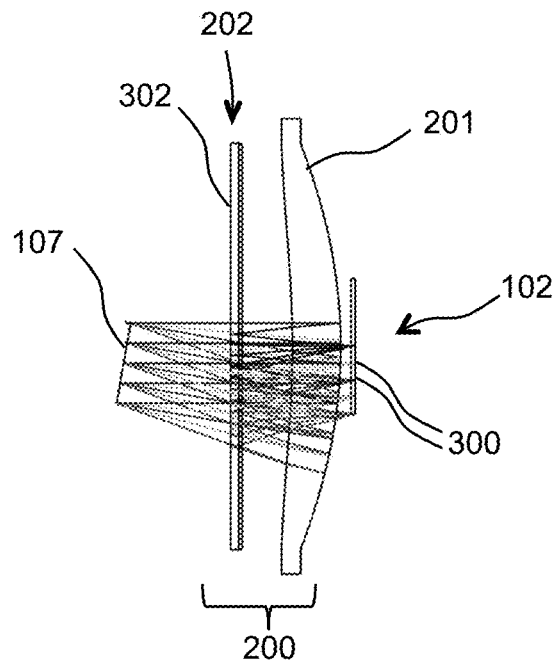
Figure 3C:
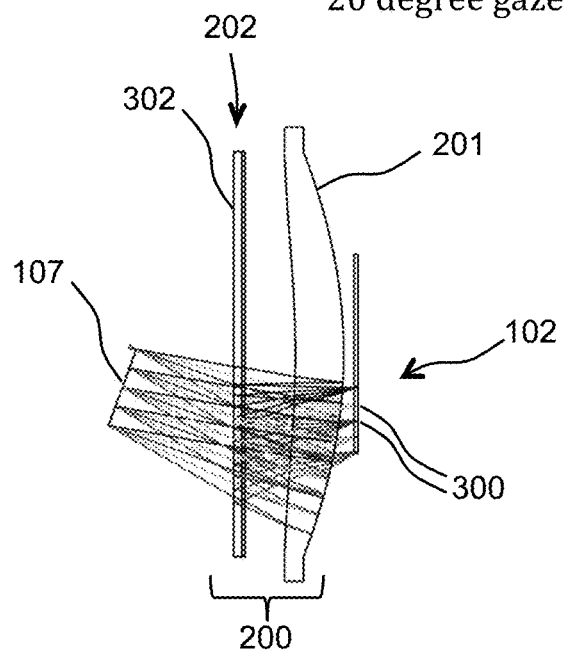
Figure 3D:
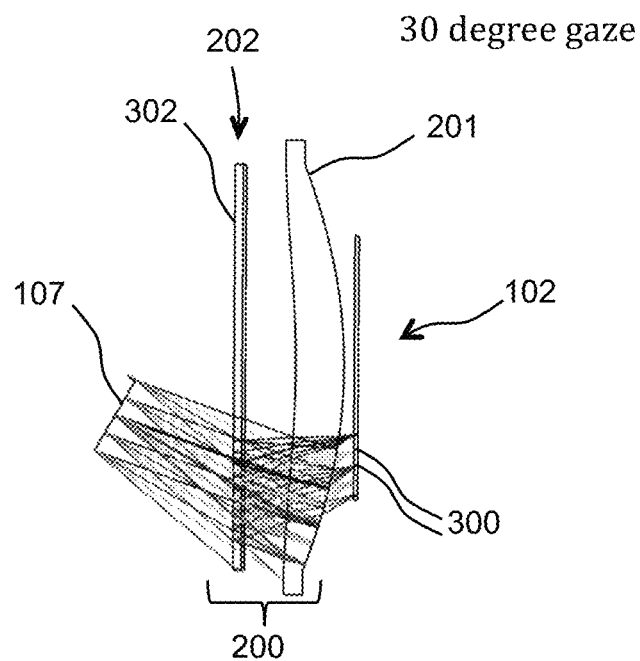

Reference is now made to FIGS. 3A to 3D showing ray tracing simulations for the pancake lens 200, at gaze angles of 0 degrees (FIG. 3A), 10 degrees (FIG. 3B), 20 degrees (FIG. 3C), and 30 degrees (FIG. 3D). In FIGS. 3A to 3D, the polarization-selective reflector 202 includes the second quarter-wave waveplate 214 on the linear reflective polarizer 216, which is supported by a flat substrate surface 302, i.e. both the quarter-wave waveplate 214 and the linear reflective polarizer 216 are flat. To provide more degrees of freedom for optical design of the pancake lens 200, the substrate surface 302 can also be mildly curved, in which case the second quarter-wave waveplate 214 and the linear reflective polarizer 216 are similarly curved. For convenience, the rays are traced from the pupil 107 back to the electronic display 102, such that the lens performance can be judged by size and location of spots 300 on the surface of the electronic display 102. Five parallel ray beams have been traced, each forming one of the spots 300 on the electronic display 102. The pancake lens 200 performance has been optimized for the gaze angle range of +/−30 degrees, as the beams are converging to tight spots on the electronic display even at the extreme angle of +/−30 degrees.

Figure 4A:
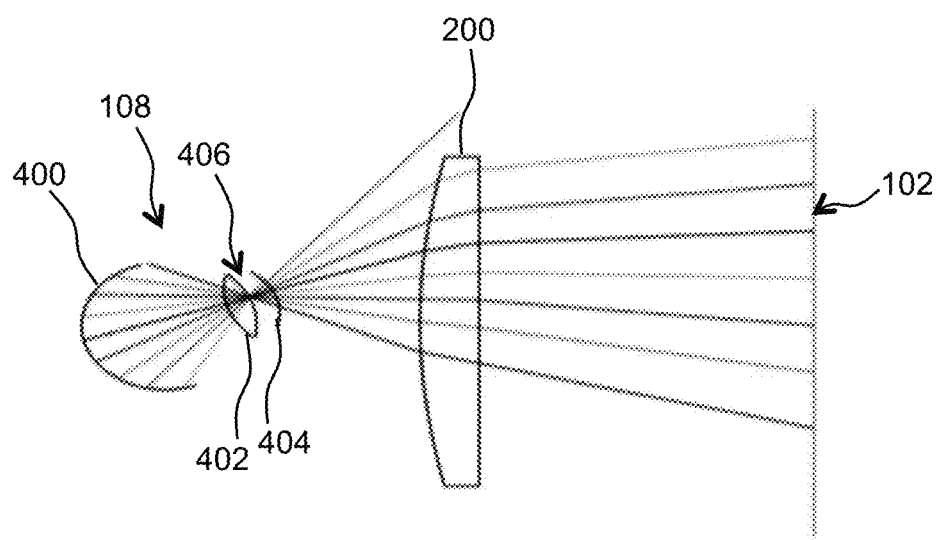
FIGS. 4A to 4C are schematic ray-trace views of an HMD at different gaze angles, illustrating the pupil swim effect.
Figure 4B:
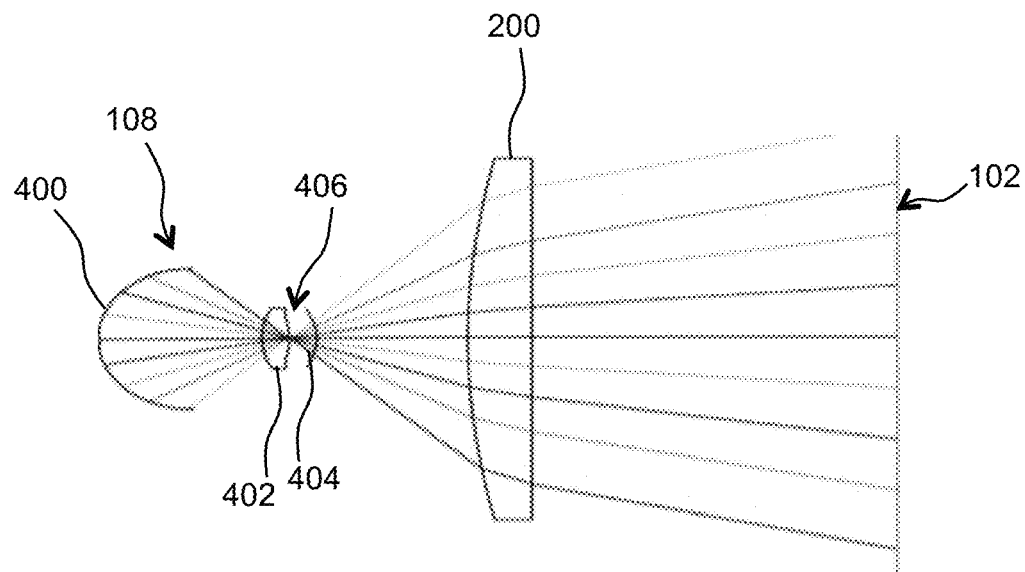
Figure 4C:
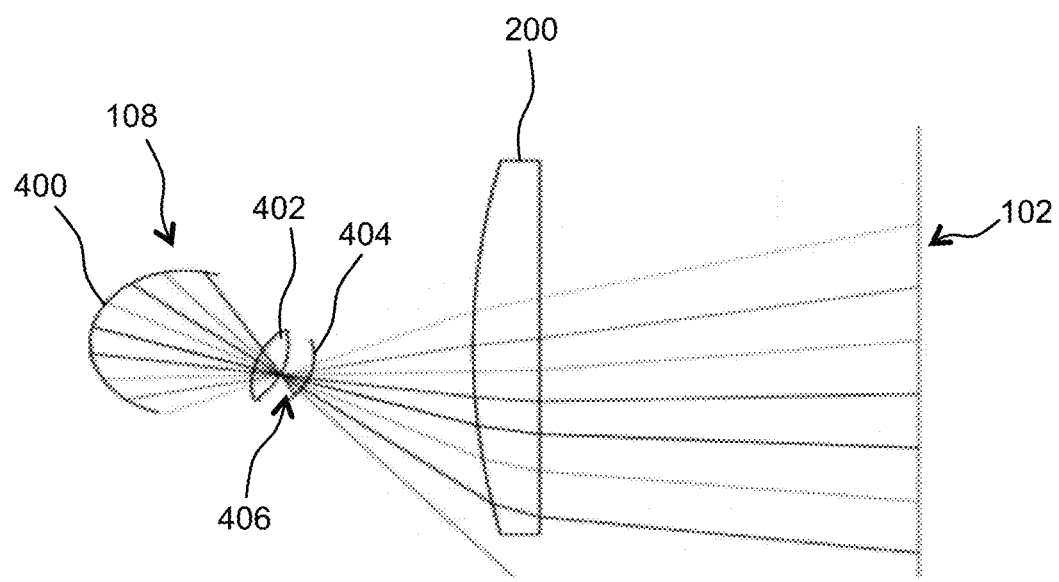

Turning to FIGS. 4A to 4C, equiangular rays have been traced from retina 400 of the eye 108 to equally spaced locations on the electronic display 102 at three different gaze angles of the eye 108 including an eye lens 402 and a cornea 404. Only chief rays have been traced for clarity. In going from FIG. 4A to FIG. 4B to FIG. 4C, as the eye 108 is rotated, a ray crossing point 406 "floats" or "swims" across the eye lens 402, which may cause a movement or "swim" of the exit pupil of the pancake lens 200 at different gaze angles. This effect can result in change of a visible image distortion as the gaze angle of the eye changes, which may cause eye strain and discomfort due to apparent movement of peripheral objects upon changing a direction of the gaze.

Figure 5A:
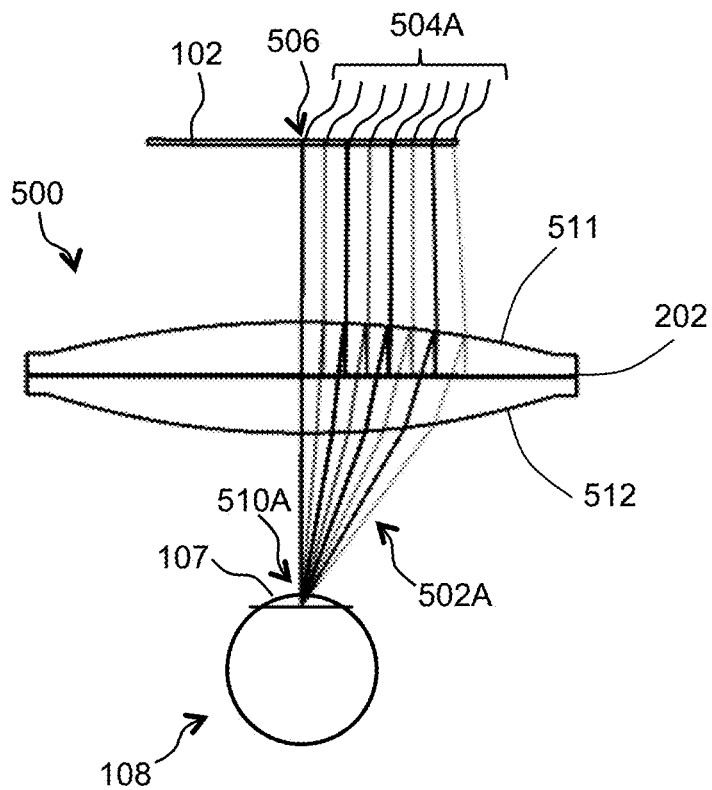
FIGS. 5A and 5B are ray-trace side views of a pancake lens showing forward and gaze distortions, respectively.
Figure 5B:
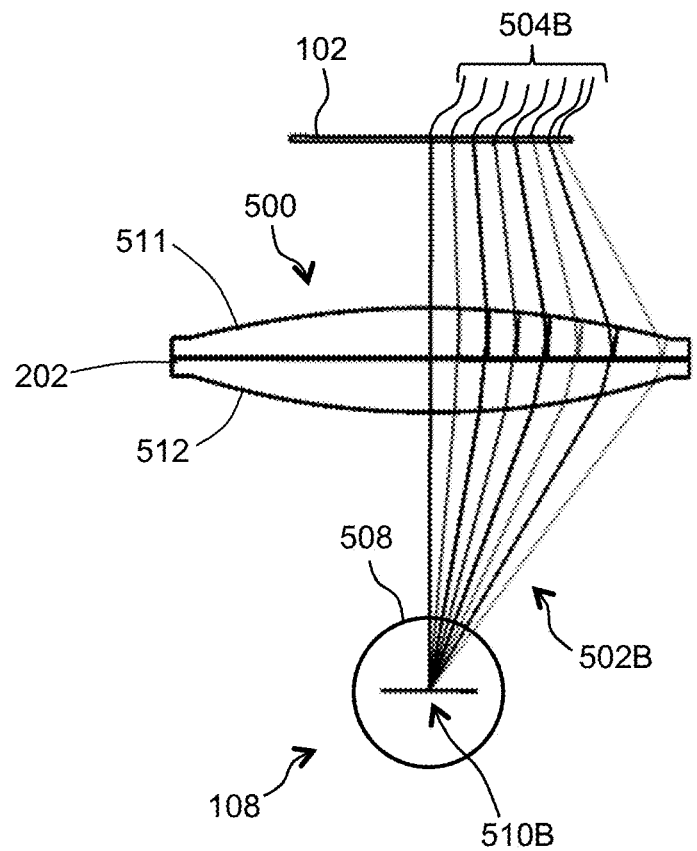

Referring to FIG. 5A, a fan 502A of first equiangular optical rays is traced from a center of the pupil 107 of the user's eye 108 to the electronic display 102 through a pancake lens 500. The pancake lens 500 of FIGS. 5A and 5B is similar to the pancake lens 200 of FIG. 2A, only in the pancake lens 500, the polarization-selective reflector 202 is disposed at a flat boundary between lens "halves" 511 and 512. A "forward distortion" is defined herein as a set of distances between points of interception 504A of the first equiangular optical rays fan 502A with the electronic display 102 when rays of the first equiangular optical rays fan 502A are propagated, or traced, from a center 510A of the pupil 107 of the eye 108 back to the electronic display 102. The configuration of FIG. 5A corresponds to a gaze line of the eye 108 straight at a center 506 of the electronic display 102, when the user views the scene displayed by the electronic display 102 with both the fovea and also with the peripheral retina. One can see that the pancake lens 500 is well optimized for forward distortion, as the distances between the points of interception 504A are nearly equal.

Turning to FIG. 5B, a fan 502B of second equiangular optical rays is traced from a center of the user's eye 108 to the electronic display 102 through the pancake lens 500. A "gaze distortion" is defined herein as a set of distances between points of interception 504B of the second equiangular optical rays fan 502B with the electronic display 102 when rays of the second equiangular optical rays fan 502B are propagated from a center 510B of the eye 108 back to the electronic display 102. Each ray of the second fan 502B propagates through a center of the pupil, not shown, at different gaze angles corresponding to different locations of the pupil. As the gaze angle changes, the center of the pupil moves to match the gaze direction and field of view. The center of the pupil moves along a line 508, which roughly repeats a contour of the eye 108. This is why the chief rays traced through the pupil center at different locations of the pupil intersect at the center of the eye 108, which is about 12 mm away from the eye's pupil. The configuration of FIG. 5B thus corresponds to different gaze angles, as the user employs their foveal sight to observe different portions of the image displayed by the electronic display 102. One can see that the gaze distortion is different from the forward distortion by comparing the distances between the points of interception 504B in FIG. 5B with the distances between the points of interception 504A in FIG. 5A.

Figure 6A:
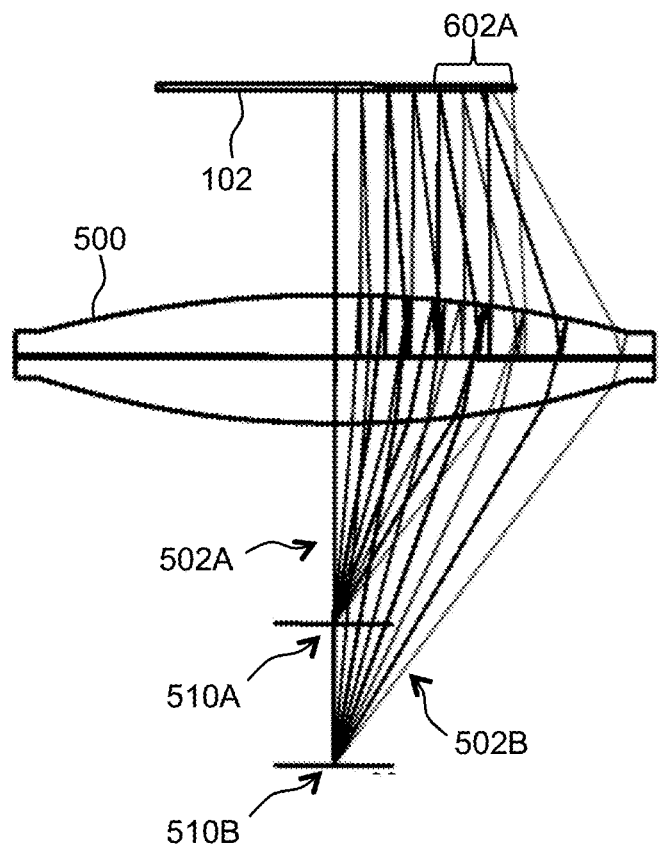
FIGS. 6A and 6B are superimposed ray-trace side views of a pancake lens showing a non-optimized (FIG. 6A) and optimized (FIG. 6B) pupil swim defined as a difference between the forward and gaze distortions.

The distances between points of interception are directly compared in FIG. 6A, which shows the ray fans 502A of FIG. 5A and 502B of FIG. 5B superimposed for comparison. If the forward and gaze distortions were equal, the corresponding rays of the ray fans 502A and 502B would intersect with the electronic display 102 at same locations, and accordingly the distances between the corresponding points of intersection would be the same for the forward and gaze distortions, i.e. for the straight and side glances. However, as clearly seen at a side 602A of the electronic display 102A, the intersections are not at the same locations. This results in a visually noticeable difference between the forward distortion of the image at a central position of the pupil 107, i.e. when the user looks straight at the center 506 of the electronic display 102, and the gaze distortion of the image at an off-center position of the pupil 107, i.e. when the user looks at a side of the electronic display 102, e.g. the side 602A, leading to distortion and bending of objects as the user looks around a virtual scene. It is noted that the pupil swim and resulting distortions may appear even when a pancake lens well optimized for spot size at different viewing angles.

In accordance with an embodiment of the present disclosure, a merit function for the pancake lens 500, or for any lens for that matter, can be additionally constrained for lens optimization in optical design software to reduce a difference between the points of interception 504A and 504B of the first 502A and second 502B ray fans, thereby reducing a difference between image distortions and associated pupil swim. In one embodiment, the lens merit function is configured such that a difference between distortions of an image displayed by the electronic display at first and second different gaze angles of the user's eye is lessened. For example, the first position can be a central position of the pupil corresponding to the forward distortion of the image, and the second position can be an off-center position of the pupil corresponding to gaze distortion of the image. The forward distortion can be defined by a set of distances between points of interception of the first equiangular optical rays fan 502A with the electronic display 102 when rays of the first equiangular optical rays fan 502A are traced from the pupil 107 of the eye 108 back to the electronic display 102, and the gaze distortion can be defined by a set of distances between points of interception of the second equiangular optical rays fan 502B with the electronic display 102, when rays of the second equiangular optical rays fan 502B are traced from within the eye 108 and back to the electronic display 102. It is noted that the merit function may be optimized at different visual accommodation distances of the eye for each one, or both of, the two different gaze angles. By way of a non-limiting example, the merit function may be optimized for visual accommodation distance of 2 meters or more, with the electronic display 102 being disposed only several centimeters away from the pancake lens 500.

Other, functionally equivalent, definitions of the merit functions are possible. Furthermore, while a specific merit function definition may depend on type of a lens being optimized, e.g. a refractive "smooth" lens, a pancake lens, or Fresnel lens, etc., the merit function operands equating the forward and gaze distortions are defined by launched and landed ray positions and angles, and thus may be similar for different types of lenses. The lens optimization may also account for a variation of eye relief distances. By way of a non-limiting example, the lens may be configured to accommodate a variation of a distance between the eye and the lens of up to 10 mm. The lens optimization may also account for a variation of inter-pupillary distances (IPD) between different users. For example, the lens may be configured to accommodate a variation of a lateral offset between the pupil and a center of the lens of up to 10 mm.

Figure 6B:
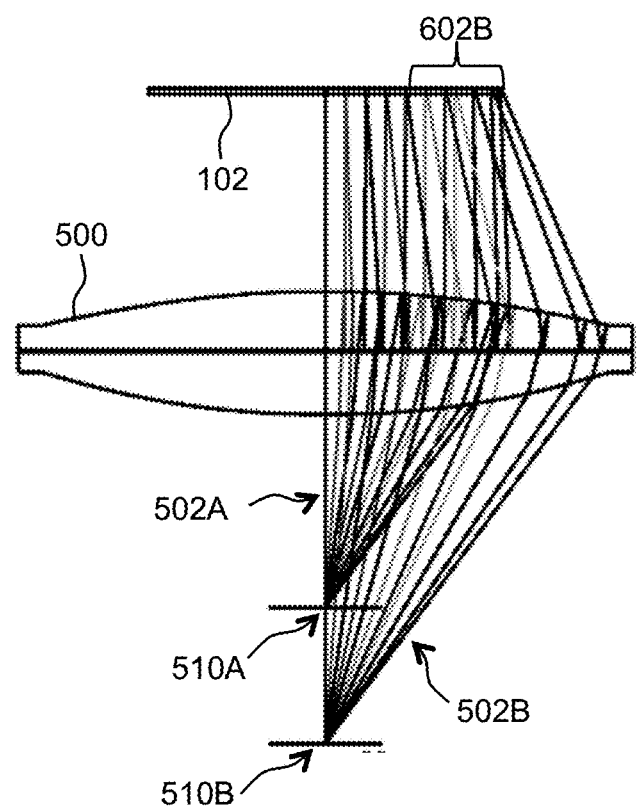

Referring to FIG. 6B, a performance of an optimized pancake lens 600 is shown. In FIG. 6B, the corresponding rays of the ray fans 502A and 502B intersect with the electronic display 102 at same locations, and accordingly the distances between the points of intersection are the same everywhere, including a side 602B of the electronic display 102. Consequently, a little or no difference is present between the forward distortion of the image at the central position of the pupil 107, and the gaze distortion of the image at an off-center position of the pupil 107, lessening the apparent distortion and bending of objects as the user looks around the virtual scene.

Figure 7A:
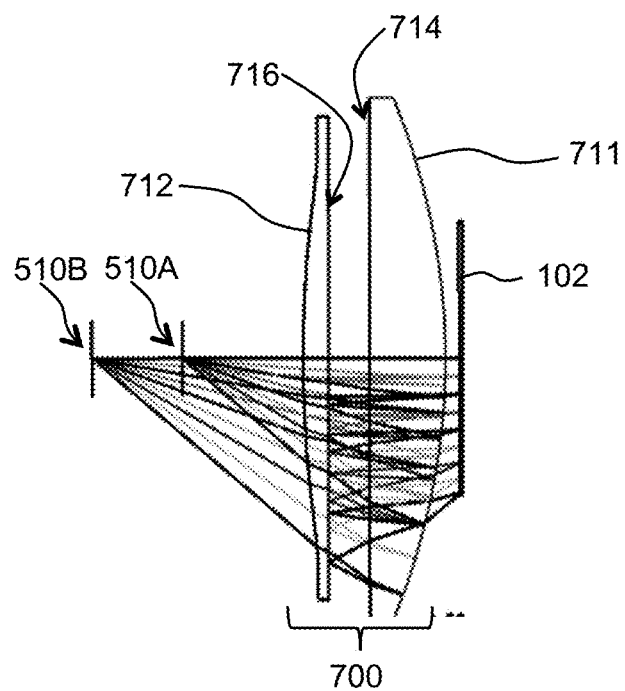
FIGS. 7A and 7B are ray-trace side views of an optimized large-field-of-view (FOV) pancake lens having a waveplate and a polarizing reflector on separate lens elements.
Figure 7B:
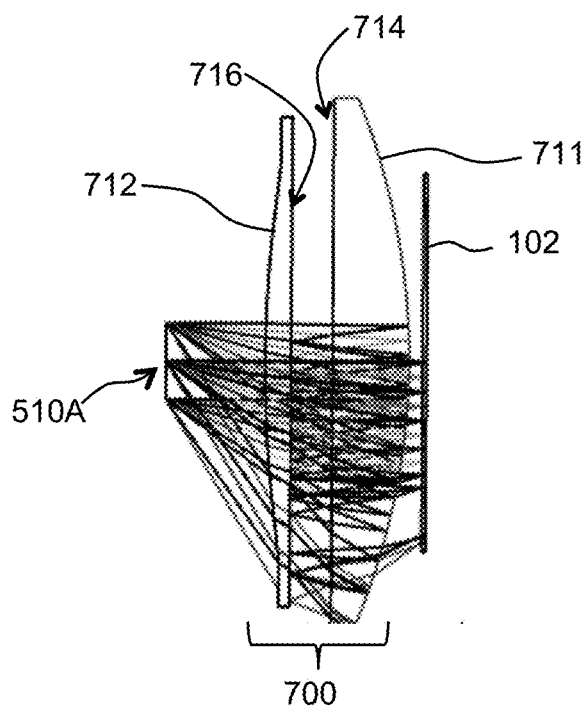

FIGS. 7A and 7B show another example of a pancake lens 700 optimized for both the pupil swim (FIG. 7A) and spot size (FIG. 7B) using the distortion-equalizing merit function described above. The pancake lens 700 includes first 711 and second 712 elements spaced apart from each other. In the embodiment shown, the first element 711 includes a quarter-wave waveplate 714, and the second element includes a reflective linear polarizer 716, which may face each other as shown. The quarter-wave waveplate 714 has a same function as the second quarter-wave waveplate 214 of FIG. 2B, and the reflective linear polarizer 716 has a same function as the reflective linear polarizer 216 of FIG. 2B. Disposing the quarter-wave waveplate 714 and the reflective linear polarizer 716 on different lens elements 711 and 712 is advantageous for technological reasons, as it provides both polarization elements with separate substrates. Furthermore, it is more straightforward, although not required, to make the quarter-wave waveplate 714 and the reflective linear polarizer 716 flat. The quarter-wave waveplate 714 and the reflective linear polarizer 716 may also be disposed on moderately curved surfaces, if required. The lens may be optimized for an electronic display having a diagonal length of between 1.5 inches and 3 inches. The lens may have a diameter of at least 45 mm and/or a thickness of no greater than 30 mm. It is to be understood that various other implementations of a pancake lens with reduced pupil swim are possible, with a variety of electronic display types.

Figure 8:
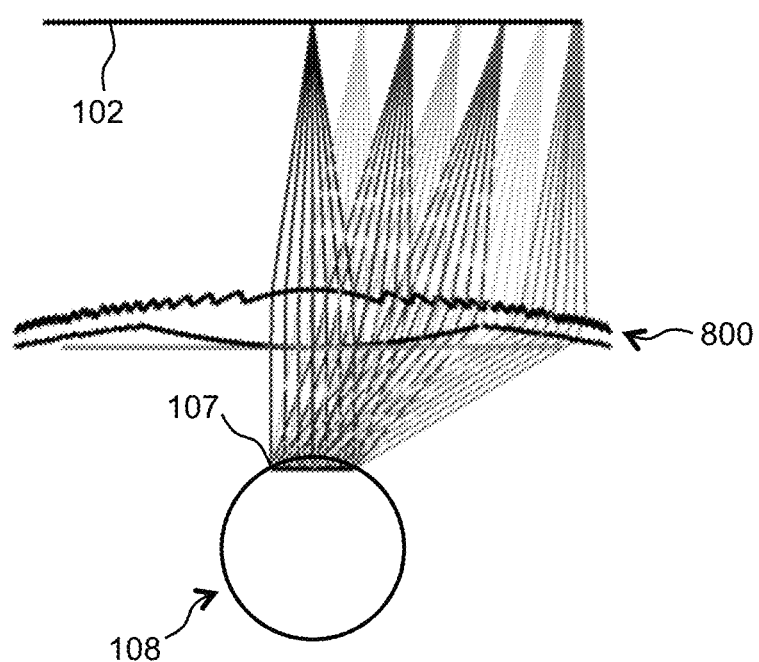
FIG. 8 is a ray-trace side view of a Fresnel lens that can be used in the HMD of FIG. 1, illustrating lens performance at a straight gaze.
Figure 9A:
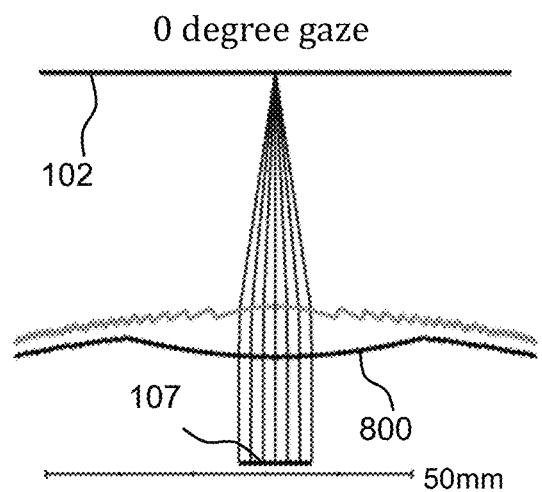
FIGS. 9A to 9D are ray-trace side views of a Fresnel lens at different gaze angles, according to one example.
Figure 9B:
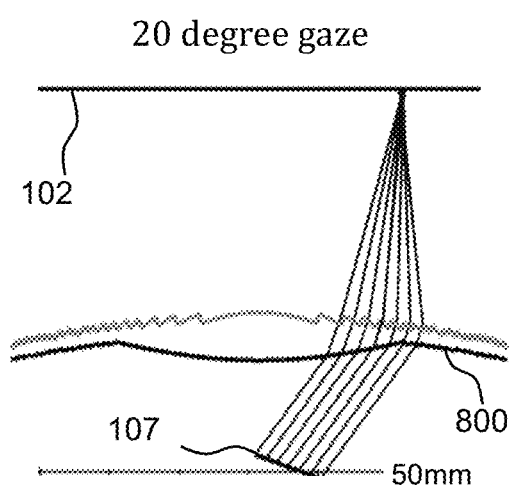
Figure 9C:
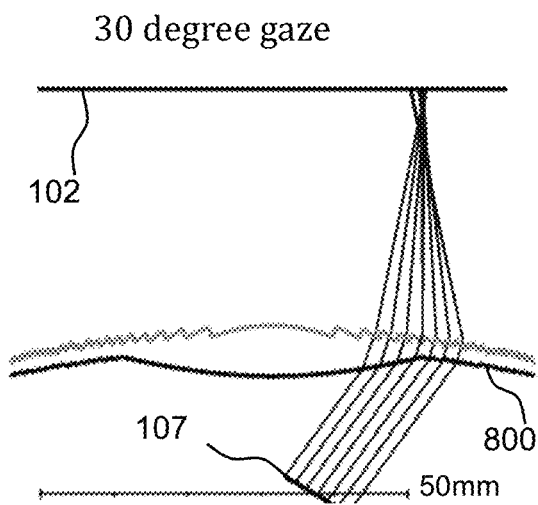
Figure 9D:
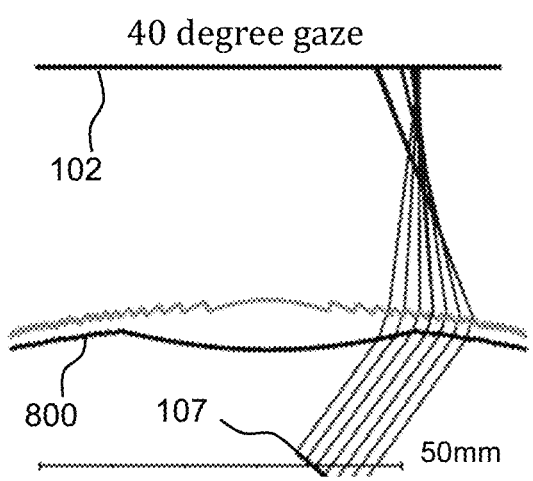

Other types of lenses are also possible for use in the HMD 100 of FIG. 1. By way of a non-limiting example, Fresnel lenses may be used. Fresnel lenses have an advantage of being thin and lightweight, while having a reasonably large field of view (FOV). Referring to FIG. 8, a Fresnel lens 800 has been optimized for spot size at the overall FOV of over 100 degrees for the centered pupil position. Rays traced from the pupil 107 of the user's eye 106 back to the electronic display 102 are focused into tight spots on the electronic display 102. FIGS. 9A to 9D illustrate the spot size performance of the same Fresnel lens 800 at gaze angles of 0 degrees (FIG. 9A), 20 degrees (FIG. 9B), 30 degrees (FIG. 9C), and 40 degrees (FIG. 9D). It is seen that, although the strait-view performance of the Fresnel lens 800 is good, the performance begins to degrade at larger gaze angles, especially at 30 and 40 degrees off axis. Thus, it may be advantageous to optimize the Fresnel lens 800 not only at the central but also at side positions of the pupil corresponding to oblique, i.e. non-straight, gaze angles.

Figure 10A:
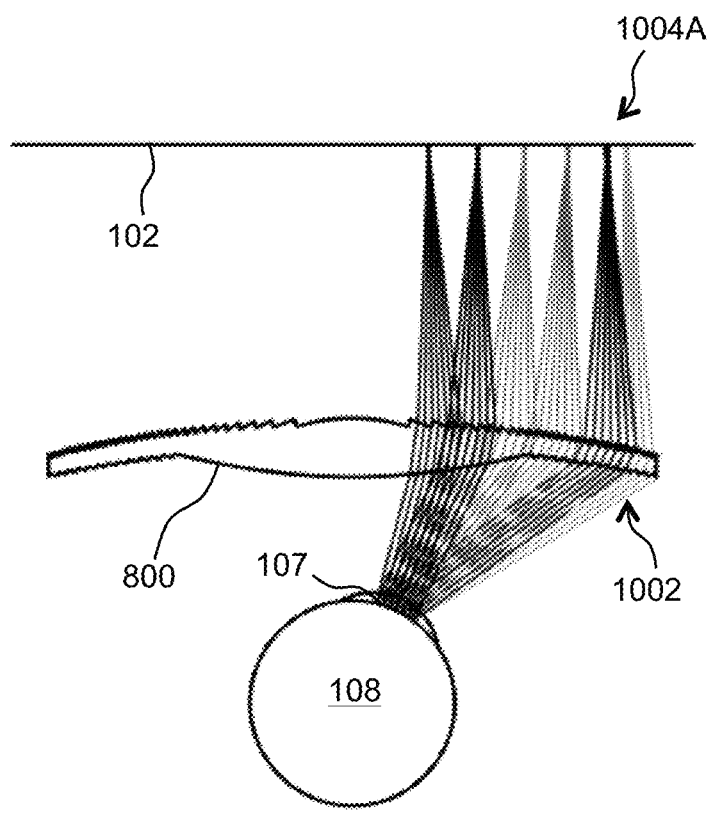
FIGS. 10A and 10B are ray-trace side views of a Fresnel lens at two different gaze angles, illustrating the difference between focusing performance and pupil swim.
Figure 10B:
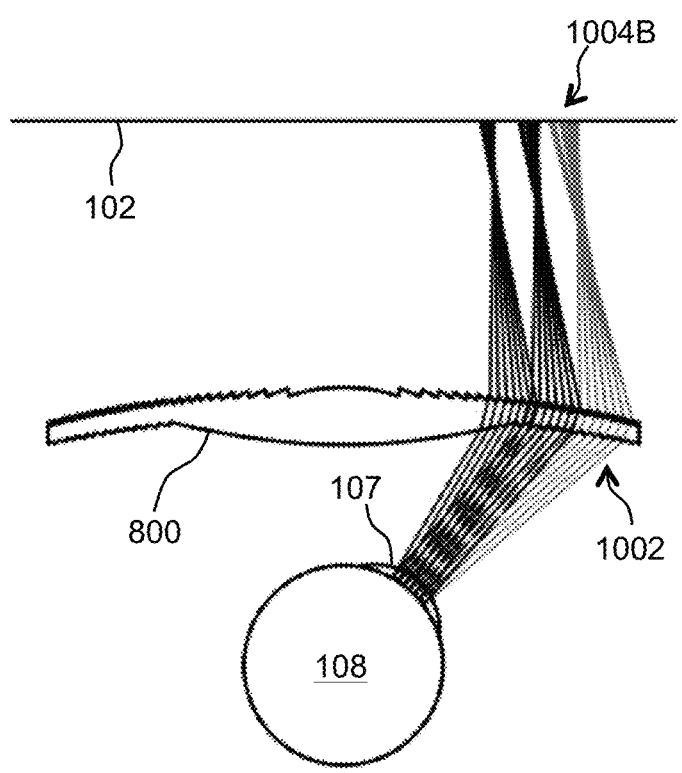

Referring to FIG. 10A, the Fresnel lens 800 performance for an off-axis gaze angle is illustrated, with tight spots in an area 1004A on the electronic display 102. In FIG. 10B, the gaze angle is further increased, and the rays are traced through a same side area 1002 of the Fresnel lens 800. It is seen that the spot performance at a corresponding location 1004B is considerably degraded, which can also cause a pupil swim.

Figure 11A:
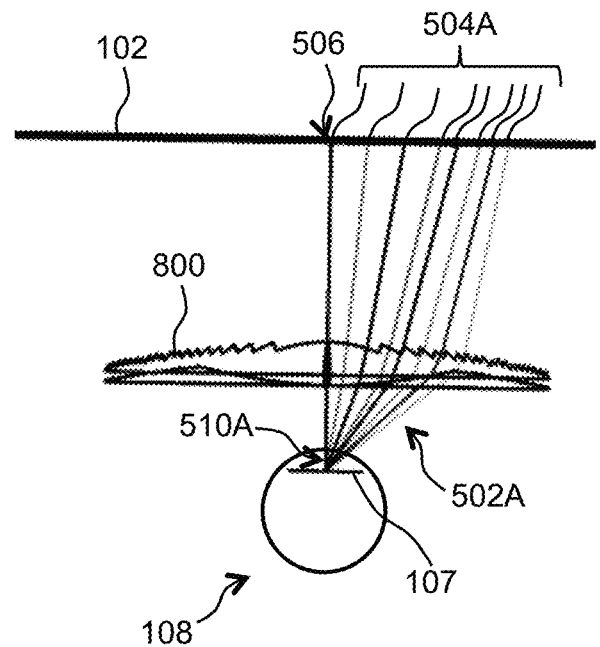
FIGS. 11A and 11B are ray-trace side views of a Fresnel lens showing forward and gaze distortions, respectively.
Figure 11B:
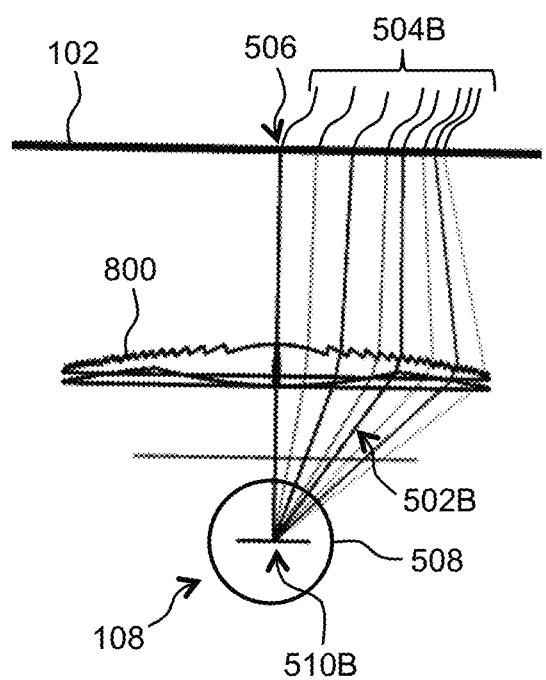

FIGS. 11A and 11B are Fresnel lens ray trace diagrams similar to those of FIGS. 5A and 5B discussed above with reference to the pancake lens 500. In FIG. 11A, the first equiangular optical rays fan 502A is traced from the center 510A of the pupil 107 of the user's eye 108 to the electronic display 102 through the Fresnel lens 800. The configuration of FIG. 11A corresponds to a gaze line of the eye 108 straight at the center 506 of the electronic display 102, when the user views the scene displayed by the electronic display 102 with both the fovea and with the peripheral retina. One can see that the Fresnel lens 800 is well optimized for forward distortion, as the distances between the points of interception 504 are nearly equal.

In FIG. 11B, the fan 502B of second equiangular optical rays is traced from the center of the user's eye 108 to the electronic display 102 through the Fresnel lens 800. Each ray of the second fan 502B propagates through a center of the pupil, now shown, at different gaze angles corresponding to different locations of the pupil. As the gaze angle changes, a center of the pupil moves to match the gaze direction and field of view. The center of the pupil moves along a line 508, which roughly repeats a contour of the eye 108. This is why the chief rays traced through the pupil center at different locations of the pupil intersect at the center 510B of the eye 108. The configuration of FIG. 11B thus corresponds to different gaze angles, as the user employs their foveal sight to focus on different portions of the image displayed by the electronic display 102. One can see that the gaze distortion is different from the forward distortion by comparing the distances between the points of interception 504B in FIG. 11B with the distances between the points of interception 504A in FIG. 11A.

Figure 12A:
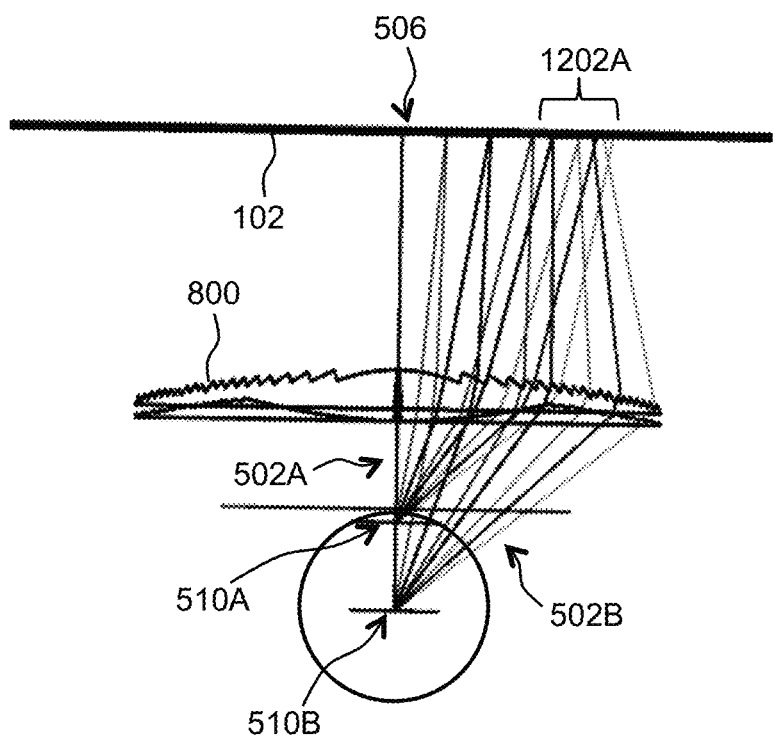
FIGS. 12A and 12B are superimposed ray-trace side views of a Fresnel lens showing a non-optimized (FIG. 12A) and optimized (FIG. 12B) pupil swim defined as a difference between the forward and gaze distortions.

The distances between points of interception are directly compared in FIG. 12A, which is similar to FIG. 6A. FIG. 12A shows the ray fans 502A of FIG. 11A and 502B of FIG. 11B superimposed. If the forward and gaze distortions were equal, the corresponding rays of the ray fans 502A and 502B would intersect with the electronic display 102 at same locations, and accordingly the distances between the points of intersection would be the same. However, as clearly seen at a side 1202A of the electronic display 102A, the intersections are not at the same locations. This results in a visually noticeable difference between the forward distortion of the image at a central position of the pupil 107, i.e. when the user looks straight at the center 506 of the electronic display 102, and the gaze distortion of the image at an off-center position of the pupil 107, i.e. when the user looks at a side of the electronic display 102, e.g. the side 1202A, leading to distortion and bending of objects as the user looks around a virtual scene. It is noted that the pupil swim and resulting distortions may appear even for a Fresnel lens optimized for spot size at different viewing angles.

Figure 12B:
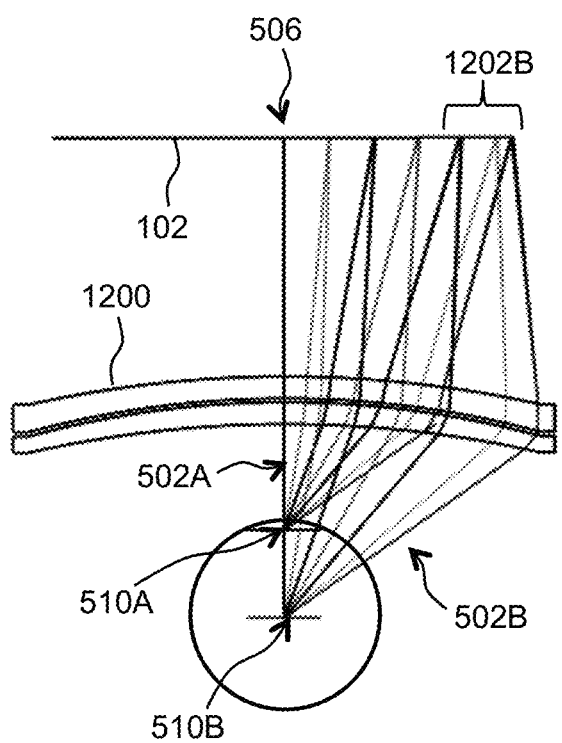

Referring to FIG. 12B, a performance of an optimized Fresnel lens 1200 is illustrated. Like in the case of the pancake lens 600 above, optimization of the Fresnel lens 1200 was based on a merit function constrained to reduce a difference between the points of interception 504A and 504B of the first 502A and second 502B ray fans, thereby reducing image distortions caused by the pupil swim. In FIG. 12B, the corresponding rays of the ray fans 502A and 502B intersect with the electronic display 102 at same locations, and accordingly the distances between the points of intersection are the same everywhere, including a side 1202B. Consequently, a little or no difference is present between the forward distortion of the image at the central position of the pupil 107, and the gaze distortion of the image at an off-center position of the pupil 107, lessening the distortion and bending of objects as the user looks around a virtual scene. It is noted that, once the forward/gaze distortions are made equal to lessen the pupil swim of a lens, any remaining distortion of the image may be compensated for in software, the compensation being independent on the gaze direction due to the suppressed pupil swim.

Fresnel lenses for HMD applications may be implemented in several ways. In one embodiment, the lens may include first and second lens elements. Each one of the first and second elements may include at least one of: Fresnel lens, smooth or "clear" lens, or partial Fresnel/smooth lens. The Fresnel lens surface, or several such surfaces, may be configured to face away from the eye, for better reliability. In one embodiment, no Fresnel lens surface faces the eye. Entirely smooth lenses may also be optimized to reduce the pupil swim as defined herein.

Various criteria may be employed to ensure acceptable pupil swim performance of an HMD lens, including a smooth lens, a Fresnel lens, a pancake lens, another type lens, or a combination thereof. It may be convenient to measure the image distortion in pixel pitch of the electronic display, by tracing rays back from the user's eye and determining where the rays land on the electronic display surface. The lens can be optimized to lessen a difference between distortions of an image displayed by the electronic display measured in pixel pitch units at first and second different gaze angles the user's eye. By way of a non-limiting example, one criterion may be that the pupil swim, defined as the difference between the distortions at the straight and gaze angles, is less than 4 times pitch of the pixels of the electronic display at a diameter of the pupil of 5 mm, at any gaze angle of the user's eye within a range of between −30 and 30 degrees, and at a field of view (FOV) of −5 to 5 degrees. According to another example criterion, the difference between distortions should be less than 10 times pitch of the pixels of the electronic display at a diameter of the pupil of 5 mm and at a gaze angle of the user's eye larger than +/−30 degrees but less than e.g. 75 degrees. For both criteria, the first gaze angle may correspond to a gaze line of the eye straight a center of the electronic display, and the second gaze angle may correspond to a gaze line of the eye off-center of the electronic display. The image distortion may be lessened at the center, at an edge, or both at the center and the edge of the display. A more straightforward criterion of the pupil swim to be less than 10 pixel pitch values may also be used.

The limitation conditions the pupil swim may also be expressed in angular units at the eye's pupil location, making it independent on the pitch of the electronic display selected for use in an HMD. For example, the pupil swim can be less than 15 arcmin at a diameter of the pupil of 5 mm, at any gaze angle of the user's eye within a range of between −30 and 30 degrees, and at a field of view (FOV) of −5 to 5 degrees. In another example, the pupil swim is less than 40 arcmin at a diameter of the pupil of 5 mm and at a gaze angle of the user's eye larger than +/−30 degrees but less than +/−75 degrees. A simple angular limitation on the pupil swim, e.g. less than 30 arcmin for all viewing conditions and gaze angles, may also be employed, depending on the application and required quality of virtual experience. The FOV requirements may also differ. In one example, the lens has a monocular FOV of greater than 120 degrees but less than 140 degrees. In another example, the lens has a binocular horizontal FOV of greater than 130 degrees but less than 170 degrees.

Figure 13:
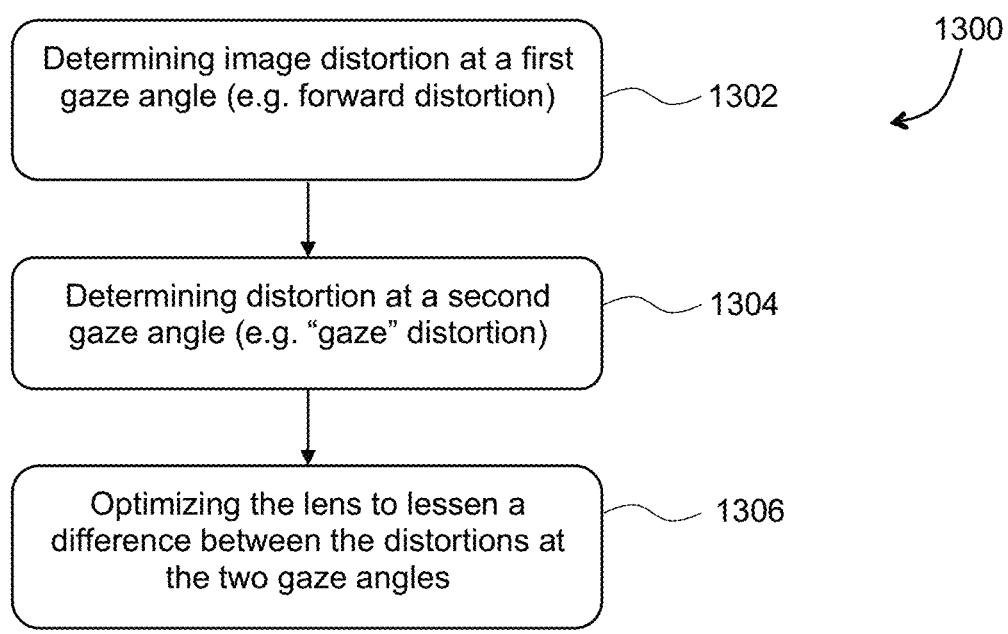
FIG. 13 is a flow chart of a method for configuring a lens for a head mounted display in accordance with the present disclosure.

Referring now to FIG. 13, a method 1300 for configuring a lens for a head mounted display may include determining (1302) image distortion at a first gaze angle, for example determining the image distortion at the forward angle, corresponding to a center of electronic display of the head mounted display. As explained above, the forward image distortion may be defined by a set of distances between points of intersection of a first equiangular optical rays fan with the electronic display when rays of the first equiangular optical rays fan are propagated from the pupil back to the electronic display, while the eye looks straight at the electronic display. Then, the distortion may be determined (1304) at a second, different gaze angle, for example a slanted gaze angle at a corner of the electronic display. The second distortion is a gaze distortion defined by a set of distances between points of interception of a second equiangular optical rays fan with the electronic display when rays of the second equiangular optical rays fan are propagated from within the eye and back to the electronic display. Then, the lens may be optimized (1306) to lessen a difference between these distortions. For certainty, the rays of the first fan may be propagated from the center of the pupil, and the rays of the second fan may be propagated from the center of the eye, although other, equivalent definitions are possible. To lessen the difference between the distortions, a merit function of optical design software may include an operand representing the difference between the first and second distortions, and the optical design software may be run to lessen this operand, along with other operands including spot size at different gaze angles, for example. The criteria for achieving acceptable pupil swim performance may include any of the criteria for the difference between the first and second distortions described above. By way of a non-limiting example, the difference between distortions may be less than 4 times the pitch of the electronic display at the second gaze angle of the user's eye within a range of between −30 and 30 degrees, at a FOV of −5 to 5 degrees, and at a diameter of the pupil of 5 mm; or less than 10 times the pitch of the electronic display at the second gaze angle of the user's eye larger than +/−30 degrees but less than +/−75 degrees, and at a diameter of the pupil of 5 mm.

Figure 14:
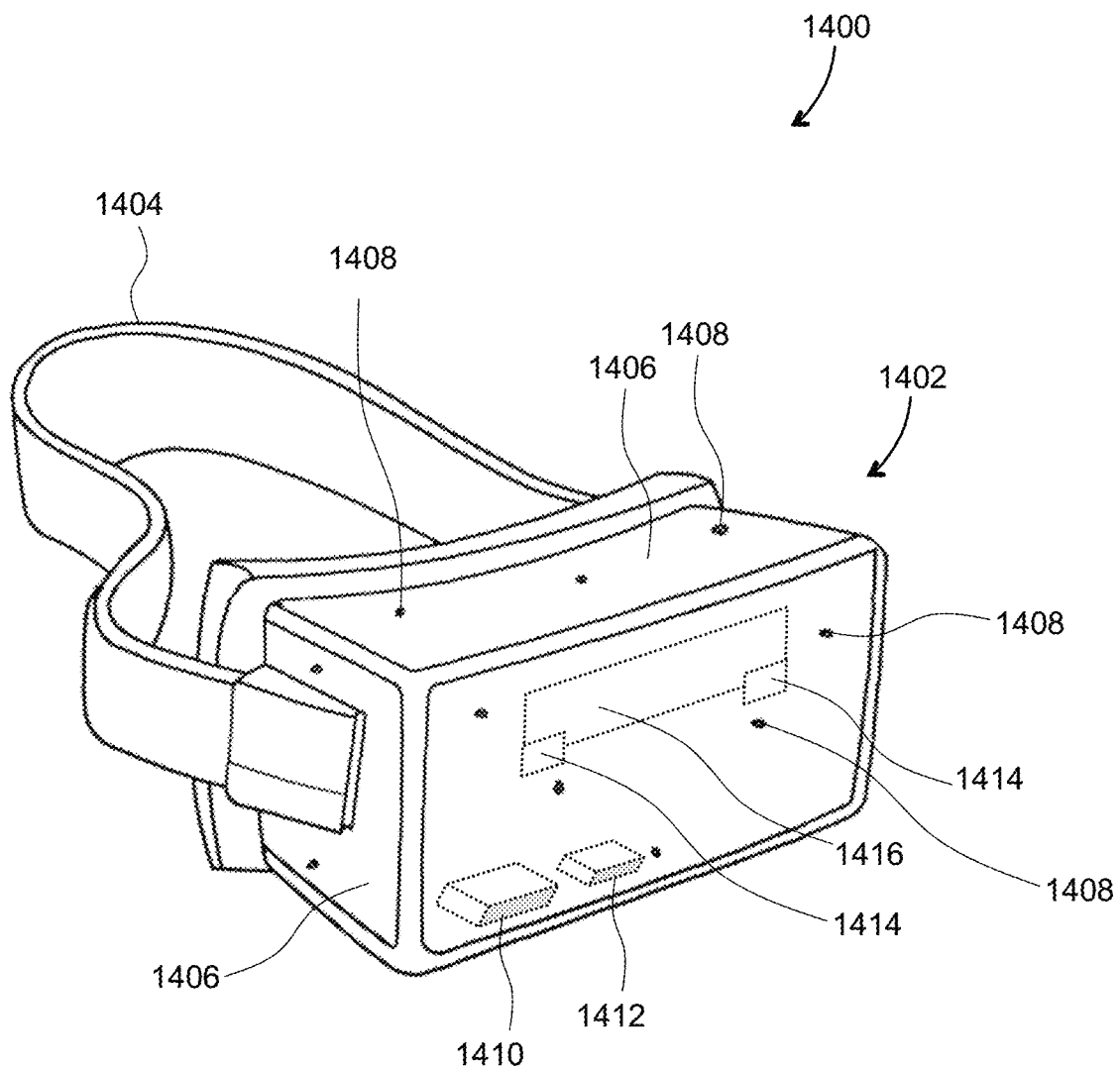
FIG. 14 is an isometric view of a head-mounted display (HMD)

Turning now to FIG. 14, a head-mounted display (HMD) 1400 may include any of the pupil swim optimized lenses described above. The HMD 1400 may provide content to a user as a part of an artificial reality system. The HMD 1400 may augment views of a physical, real-world environment with computer-generated imagery and/or to generate an entirely virtual 3D imagery. The HMD 1400 may include a front body 1402 and a head band 1404. The front body 1402 is configured for placement in front of eyes of a user, and the head band 1404 may be stretched to secure the front body 1402 on the user's head. A display module 1416 including a lens described herein may be disposed in the front body 1402 for presenting imagery to the user. Sides 1406 of the front body 1402 may be opaque or transparent.

In some embodiments, the front body 1402 includes locators 1408, an inertial measurement unit (IMU) 1410 for tracking acceleration of the HMD 1400, and position sensors 1412 for tracking position of the HMD 1400. The locators 1408 are traced by an external imaging device of a virtual reality system, such that the virtual reality system can track the location and orientation of the entire HMD 1400. Information generated by the IMU and the position sensors 1412 may be compared with the position and orientation obtained by tracking the locators 1408, for improved tracking of position and orientation of the HMD. Accurate position and orientation is important for presenting appropriate virtual scenery to the user as the latter moves and turns in 3D space.

The HMD 1400 may further include an eye tracking system 1414, which determines orientation and position of user's eyes in real time. The obtained position and orientation of the eyes allows the HMD 1400 to determine the gaze direction of the user and to adjust the image generated by the display module 1416 accordingly. In one embodiment, the vergence, that is, the convergence angle of the individual gaze directions of user's eyes, is determined. The optical power of the lenses may be the adjusted depending on the vergence to reduce or lessen the vergence-accommodation conflict. In one embodiment, the main collimating and redirecting function is performed by dedicated, non-adjustable lenses, and variable or switchable lenses are used for fine focus adjustment.

Figure 15A:
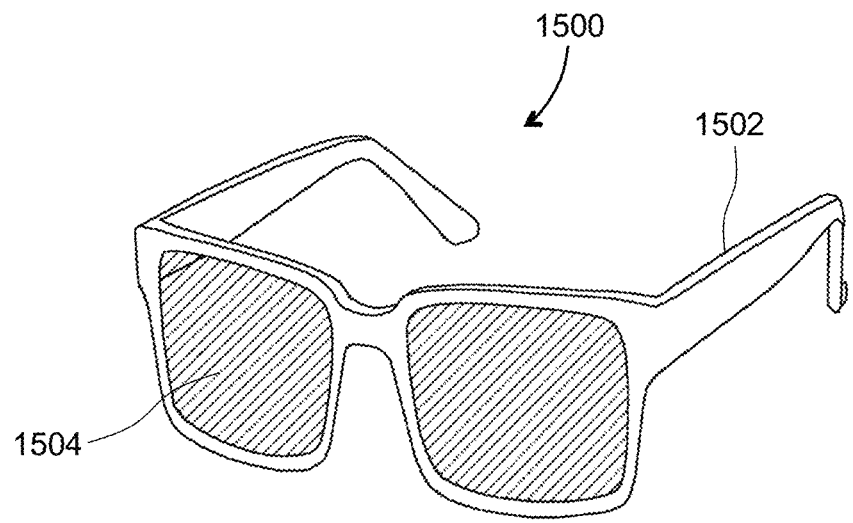
FIG. 15A is an isometric view of an eyeglasses form factor near-eye AR/VR display.
Figure 15B:
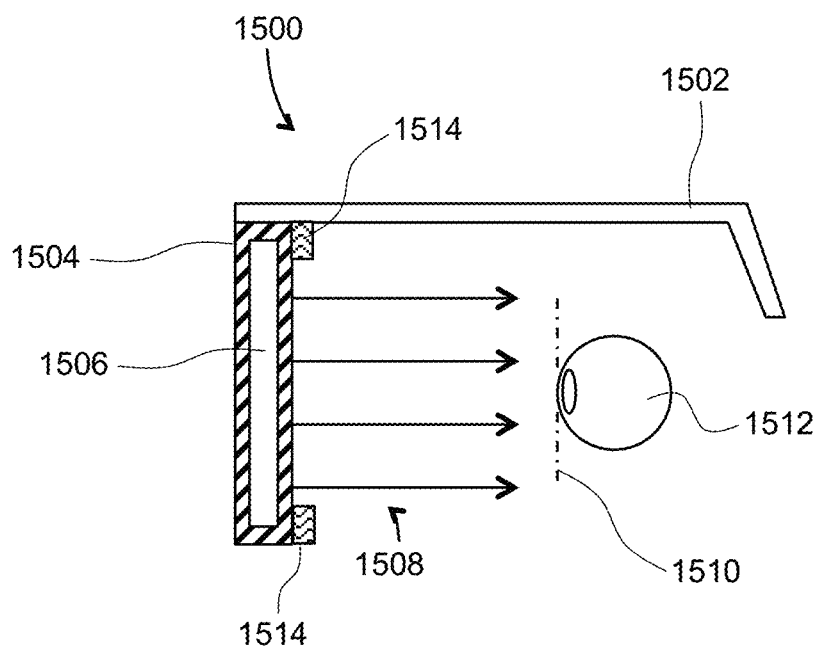
FIG. 15B is a side cross-sectional view of the near-eye AR/VR display of FIG. 15A.

Referring to FIGS. 15A and 15B, a near-eye AR/VR display 1500 is an embodiment of a head-mounted display. The near-eye AR/VR display 1500 has a frame 1502 in form of a pair of eyeglasses, and a display 1504 including a display assembly 1506. The display assembly 1506 (FIG. 15) provides image light 1508 to an eyebox 1510, defined as a geometrical area where a good-quality image may be presented to a user's eye 1512. The display assembly 1506 may include a separate VR/AR display module for each eye, or one display module for both eyes. By way of a non-limiting example, an active, i.e. switchable, grating may be coupled to a single electronic display for directing images to the left and right eyes of the user in a time-sequential manner, one frame for left eye and one frame for right eye. The electronic display of the near-eye AR/VR display 1500 and the HMD 1400 may include, without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye AR/VR display 1500 may also include an eye-tracking system 1514 for determining, in real time, the gaze direction and/or the vergence of the user's eyes 1512.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A lens for a head mounted display, wherein the lens directs image light from an electronic display of the head mounted display to a pupil of a user's eye so as to lessen a difference between a first distortion of an image displayed by the electronic display and observed through the lens at a first gaze angle of the user's eye, and a second distortion of the image displayed by the electronic display and observed through the lens at a second, different gaze angle of the user's eye.

2. The lens of claim 1, wherein the first gaze angle corresponds to a central position of the pupil, and the second gaze angle corresponds to an off-center position of the pupil.

3. The lens of claim 2, wherein the first distortion is a forward distortion defined by a set of distances between points of intersection of a first equiangular optical rays fan with the electronic display when rays of the first equiangular optical rays fan are propagated from a center of the pupil back to the electronic display, and wherein the second distortion is a gaze distortion defined by a set of distances between points of interception of a second equiangular optical rays fan with the electronic display when rays of the second equiangular optical rays fan are propagated from a center of the eye and back to the electronic display.

4. The lens of claim 3, wherein the difference between the first and second distortions is less than 15 arcmin at the second gaze angle of the user's eye within a range of between −30 and 30 degrees, at an FOV of −5 to 5 degrees, and at a diameter of the pupil of 5 mm.

5. The lens of claim 2, wherein the difference between the first and second distortions is less than 30 arcmin.

6. The lens of claim 1, wherein the lens comprises a pancake lens.

7. The lens of claim 6, wherein the pancake lens comprises a reflective linear polarizer supported by a flat or mildly curved surface.

8. The lens of claim 6, wherein the pancake lens comprises first and second elements spaced apart from each other, wherein the first element comprises a quarter-wave waveplate, and wherein the second element comprises a reflective linear polarizer.

9. The lens of claim 1, wherein the lens comprises a Fresnel lens.

10. The lens of claim 9, wherein the Fresnel lens comprises a Fresnel surface facing away from the eye.

11. The lens of claim 1, comprising first and second lens elements, wherein each one of the first and second elements comprises at least one of: Fresnel lens, smooth lens, or partial Fresnel/smooth lens.

12. The lens of claim 1, wherein at least one of: the lens has a thickness of no greater than 30 mm; or the lens has a diameter of larger than 45 mm.

13. The lens of claim 1, wherein at least one of: the lens has a monocular FOV of greater than 120 degrees but less than 140 degrees, or the lens has a binocular horizontal FOV of greater than 130 degrees but less than 170 degrees.

14. A head mounted display comprising the lens of claim 1 and the electronic display optically coupled thereto.

15. The head mounted display of claim 14, wherein the difference between the first and second distortions is less than 10 times pitch of pixels of the electronic display at the second gaze angle of the user's eye larger than +/−30 degrees but less than +/−75 degrees, and at a diameter of the pupil of 5 mm.

16. The head mounted display of claim 14, wherein the difference between the first and second distortions is less than 10 times pixel pitch of the electronic display.

17. A method of configuring a head mounted display, the method comprising providing a lens directing image light from an electronic display of the head mounted display to a pupil of a user's eye, wherein the lens lessens a difference between a first distortion of an image displayed by the electronic display and observed through the lens at a first gaze angle of the user's eye, and a second distortion of the image displayed by the electronic display and observed through the lens at a second, different gaze angle of the user's eye.

18. The method of claim 17, wherein:
the first gaze angle corresponds to a central position of the pupil, and the second gaze angle corresponds to an off-center position of the pupil; and
the first distortion is a forward distortion defined by a set of distances between points of intersection of a first equiangular optical rays fan with the electronic display when rays of the first equiangular optical rays fan are propagated from a center of the pupil back to the electronic display, and wherein the second distortion is a gaze distortion defined by a set of distances between points of interception of a second equiangular optical rays fan with the electronic display when rays of the second equiangular optical rays fan are propagated from a center of the eye and back to the electronic display.

19. The method of claim 18, wherein at least one of:
the difference between the first and second distortions is less than 4 times pixel pitch of the electronic display at the second gaze angle of the user's eye within a range of between −30 and 30 degrees, at a field of view (FOV) of −5 to 5 degrees, and at a diameter of the pupil of 5 mm; or
the difference between the first and second distortions is less than 10 times pitch of the pixels of the electronic display at the second gaze angle of the user's eye larger than +/−30 degrees but less than +/−75 degrees, and at a diameter of the pupil of 5 mm.

20. The method of claim 17, wherein providing the lens comprises selecting a merit function for the lens in optical design software for lessening the difference between the first and second distortions.

* * * * *